Sept. 10, 1940.　　　J. L. MOULDER　　　2,214,201
CLUTCH CONTROL APPARATUS
Filed March 23, 1938
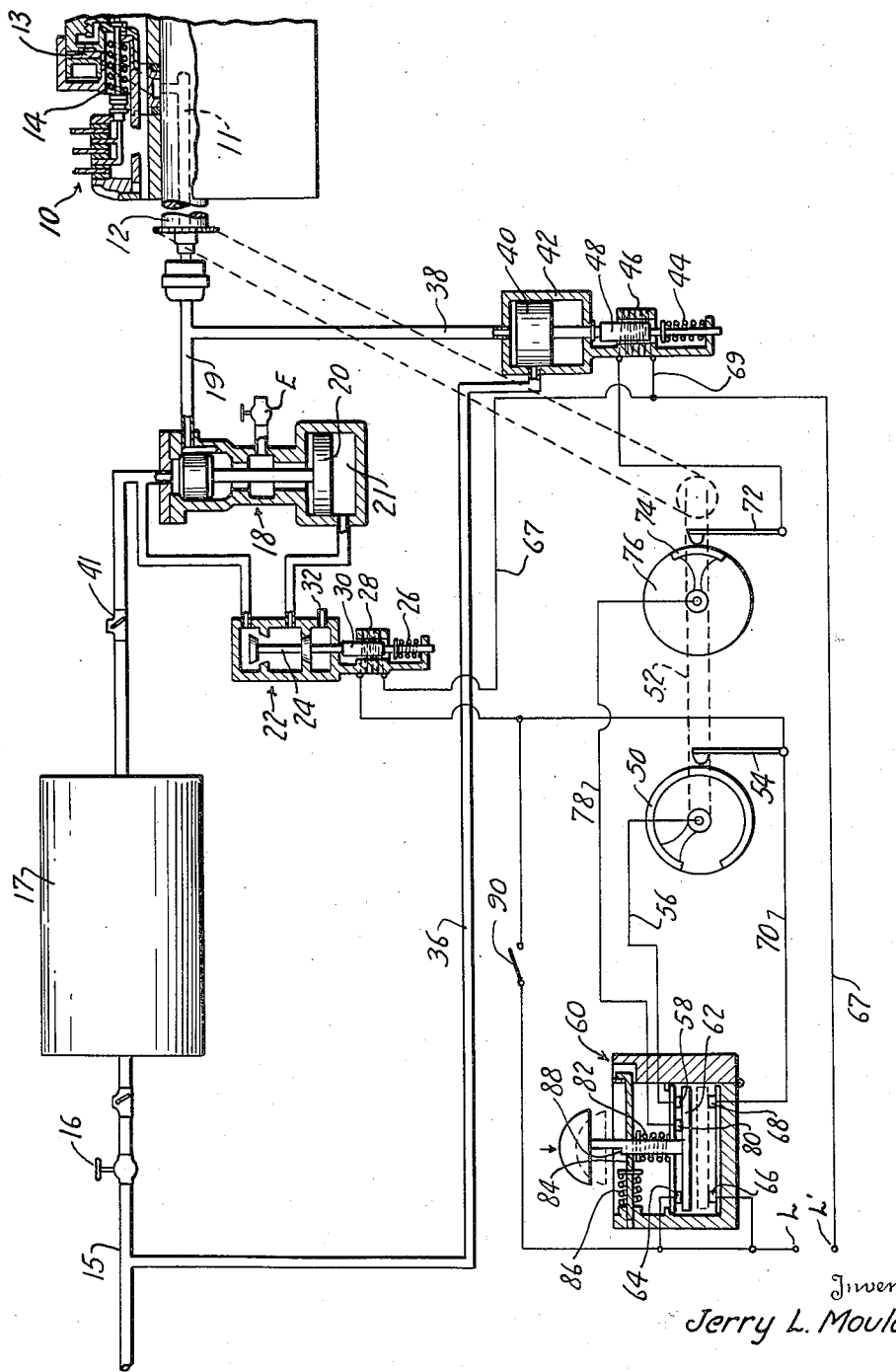
Inventor
Jerry L. Moulder
By Owen & Owen
Attorneys Patented Sept. 10, 1940

2,214,201

UNITED STATES PATENT OFFICE 2,214,201

CLUTCH CONTROL APPARATUS

Jerry L. Moulder, Toledo, Ohio, assignor to E. W. Bliss Company, Brooklyn, N. Y., a corporation of Delaware Application March 23, 1938, Serial No. 197,752

9 Claims. (Cl. 192—85)

This invention relates to apparatus for operating pneumatic clutches or the like and has for its primary object the provision of an apparatus to control the air input to a clutch in such a manner as to cause progressive degrees of engagement of the clutch parts to prevent injury thereof from suddenly imposed strains.

Another object of the invention is the provision of means to operate a pneumatic clutch or the like which will facilitate control of the pressure applied to the clutch in accordance with the load on the clutch parts.

Other objects and advantages of the invention will become apparent from the following specification, reference being had to the accompanying drawing which diagrammatically illustrates one arrangement of the parts.

Referring to the drawing, 10 designates a pneumatic clutch which may be of any suitable form, for example such as that shown in Rode & Hatch Patent No. 2,009,301. Clutches of this type are extensively applied to drawing presses to permit intermittent operation of the slides of the press from a continuously rotating power source. Air for the clutch is supplied through a bore 11 in the shaft 12 of the press and is led to an annular pressure cylinder 13 which operates to move the clutch discs together. Compression springs 14 are provided which tend to separate the clutch discs so that the driving force is removed and no power is transmitted to the slides of the press.

In the operation of a clutch of this character it is, of course, necessary that the air pressure which causes clutch engagement be higher than the pressure of the clutch release springs 14 and in addition must be high enough to cause firm engagement of the clutch discs so that no slippage will take place during the working stroke of the machine. In other words, the air pressure must be high enough so that firm engagement and complete power transmission is assured under full load. It has been customary to apply air under full pressure to the clutch whenever it was desired to impart movement to the slides of a press, and this has resulted in extensive wear on the clutch parts because of the rapid engagement caused by the high air pressure and the shocks and sudden strains caused by this engagement.

A further difficulty has been encountered in the operation of air clutches on presses when the clutch is used to "inch" the press in, for example, a die-setting operation. Here only enough power need be applied through the clutch to move the slides very slowly. If full air pressure is applied to the clutch, the full power of the driving source will be transmitted to the shaft. In die-setting operations, if the full power is applied an instant too long, the dies may close against each other improperly and be ruined.

The present invention includes separate valves for both high and low pressure air and provides a control for the valves which will cause application of the high pressure air only during a predetermined period, such as the working portion of the stroke of a press, and additional means to lock out the high pressure air valve completely during selected operations such as "inching" the press during die-setting or adjustment.

In the drawing, a high pressure air line 15 is shown in which a reducing valve 16 is inserted so that air under a selected low pressure accumulates in a suitable tank 17. The tank 17 is adapted to be placed in communication with the bore 11 of the shaft of the press and the passage leading to the clutch cylinder by a low pressure air control valve designated generally 18. The valve 18 controls communication between a line leading from tank 17 and a line 19 leading to the bore 11, and also communication between the line 19 and the atmosphere through an exhaust line E. The valve 18 may be of any suitable type and, as shown, may be normally closed by means of a piston 20 working in a cylinder 21.

The cylinder 21 is adapted to be placed in communication with the low pressure air supply line from the tank 17 by a pilot valve 22 which serves to admit air to or exhaust air from the cylinder 21. The pilot valve may include a center operating stem 24 which is moved to stand in one predetermined position by a spring 26 and, in this position, admit air to the cylinder 21. A solenoid 28 cooperates with an armature 30 carried on the stem 24 to move the stem to another predetermined position so that air admission to the cylinder 21 is closed and the air from the cylinder 21 is exhausted through a port 32 to the atmosphere. When the air is exhausted from the cylinder 21, the low pressure air valve 18 moves downwardly by reason of the air pressure on its upper surface so that air passes from the tank 17 through line 19 and bore 11 to the clutch cylinder. When standing in its upper position as shown in the drawing, the line 19 and hence the air in the clutch is in communication with the atmosphere through the exhaust line E. The rate of exhaust may be controlled by a suitable valve in the exhaust line so that the air pressure may be taken off the clutch as slowly as may be found desirable.

The high pressure air valve may be any suitable device which will open and close communication with a high pressure air source such as line 36 which is placed in direct communication with the high pressure air line 15. The valve establishes or closes communication between line 36 and a line 38 which opens into line 19 and hence into the bore 11 and to the cylinder of the air clutch. The valve in the instance shown includes a piston 40 operating in a suitable casing 42 and biased to stand in closed position by a spring 44. A solenoid 46 cooperates with an armature 48 carried on the stem of the piston 40 and when energized is adapted to move the valve to open position and thus open communication between high pressure air line 36 and line 38 leading to the clutch. Upon the solenoid being subsequently de-energized, spring 44 will return the valve 40 to closed position. Obviously any suitable valve may be used to control the high pressure air line, the form shown in the drawing being merely illustrative. A check valve 41 is provided to protect tank 17 against the admission of high pressure air from line 38.

The electric circuit for the control of solenoid 28 which operates the low pressure pilot valve includes a ring contactor 50 carried on a suitable drive shaft 52 which is driven from, or in timed relation with, the crank shaft 12 of the press. A brush 54 is connected to one side of the solenoid 28 and the contactor 50 is connected by means of line 56 to a stationary contact 58 on one side of an interposed switch 60. The switch 60 may be any suitable mechanism, but for purposes of illustration it has been shown in connection with the "inching" switch for reasons which will later become apparent. The switch is normally closed in the position shown and is moved away from this position only under particular circumstances. In the form shown, the switch includes a plate 62 adapted to establish contact between a line contact 64 and all other contacts in the same plane, which includes contact 58. Line contact 64 is connected to a power supply source designated L. The other side of solenoid 28 is connected directly through line 67 to line connection L'.

In addition to the connections above described the circuit to solenoid 28 may also be closed through an auxiliary line contact 66 and a second auxiliary contact 68 connected by line 70 to the brush 54. Contacts 66 and 68 lie in a plane parallel to but spaced from the plane of the first described contacts 58 and 64. The plate 62 is adapted to establish the circuit between contacts 66 and 68 when moved to its dotted line position.

The high pressure air valve solenoid 46 is connected at one side to line 67 by a branch line 69 and at its other side to a brush 72 which may make connection with a contact segment 74 carried on a drum 76 on the drive shaft 52. The segment 74 is connected through line 78 to a stationary contact 80 in the same plane as contacts 58 and 64 so that its circuit with line contact 64 is closed by plate 62 when the latter is in its normal running position. The segment 74 may be of any desirable circular extent corresponding to that portion of the press stroke during which high pressure air is used and is preferably confined to that portion in which the dies are closed and working.

The switch 60 shown in the drawing may constitute the "inching" switch of a press. The present invention contemplates a locking device for the "inching" switch so that once the switch has been moved from its normal running position to initiate an "inching" action of the slides, it will not return to its normal position without additional manipulation. A spring 82 normally holds the switch closed against contacts 58, 64 and 80. By manual inward movement of the switch, the plunger will open the circuit between these contacts and, if carried far enough, may close the circuit between contacts 66 and 68 and thus establish the auxiliary connection for the low pressure air valve solenoid 28. A latch bar 84 is normally urged against the plunger of the switch by a suitable spring 86 and the plunger is provided with a shoulder 88 so that once the plunger is moved inwardly nearly far enough to move plate 62 against the auxiliary contacts 66 and 68, the latch bar 84 will be forced behind shoulder 88 and will prevent return of the switch parts to their initial position. The placing of the shoulder 88 is such that the spring 82 will return the plate 62 enough to open the circuit between the auxiliary contacts so that manual movement of the plate is necessary to close this circuit. Thus, in "inching" a press the operator must hold the switch parts closed by pushing in on the switch plunger. As soon as he releases his pressure on the plunger spring 82 will open the circuit and thus de-energize solenoid 28. So long as solenoid 28 is de-energized no air enters the clutch cylinder since the main low pressure valve 18 will be closed, and hence the slides of the press will not be moved.

A starting switch 90 is provided to temporarily short-circuit the automatic control and initiate movement of the clutch by energizing solenoid 28.

The operating cycle is such that when the press has been started, air under low pressure is admitted to the clutch since contact segment 50 closes the circuit through its associated brush 54 to solenoid 28 which exhausts the air from the low pressure air valve control cylinder 21. Continued rotation of the drive shaft 52 brings contact segment 74 into engagement with its associated brush 72 and thus closes the circuit to solenoid 46 which opens the high pressure air valve 40. At this point air under high pressure enters the clutch and causes full engagement of the clutch parts. This pressure continues so long as the circuit to solenoid 46 is closed and depends on the circular extent of segment 74. When segment 74 runs out from under brush 72 the circuit to the high pressure air-valve-control solenoid 46 is opened, thus permitting spring 44 to close the valve. The clutch then continues operation under low pressure air only since the solenoid 28 is still energized. When the contact segment 50 runs out from under its associated brush 54, the circuit to solenoid 28 is opened and the spring 26 moves pilot valve 24 to a position such that air enters cylinder 21 and closes the low pressure valve 18. As the valve 18 closes the line from tank 17, line 19 is simultaneously placed in communication with the exhaust E so that the air pressure is released from the clutch. As above noted, a valve may be placed in this exhaust line so that the rate of discharge from the clutch may be controlled The low pressure on which the press operates, except for the working portion of its stroke during which the actual drawing or forming operation takes place, is just enough to overcome the pressure of springs 14. For example, if the springs are set at 30 pounds pressure, the low pressure air will be preferably from 33 pounds to 35 pounds. The high pressure air may be in the neighborhood of 85 pounds to insure full engagement of the clutch parts during the working portion of the stroke of the press. Since only the low pressure air can be used during "inching" it has been found that it is almost impossible to injure dies since the clutch will slip and be unable to transmit sufficient force to the slides of the press to cause injury.

While the invention has been described in connection with a diagrammatic showing, it will be appreciated that various changes can be made in the form and disposition of the parts without altering their relationship and without departing from the spirit of the invention as defined in the appended claims.

Having thus described my invention, what I claim as new and desire to secure by United States Letters Patent is:

1. In apparatus of the class described, a source of high pressure air, a source of low pressure air, a cyclically operating pneumatically actuated mechanism, means to initially supply low pressure air to said mechanism during a predetermined portion of its cycle of operation, means to subsequently supply high pressure air to said mechanism during another predetermined portion of its cycle of operation.

2. In apparatus of the class described, a source of high pressure air, pressure reducing means connected to said source to provide low pressure air, a low pressure air valve connected to said pressure reducing means, a high pressure air valve connected to said source, a cyclically operated pneumatically actuated mechanism, and means operating in synchronism with said mechanism to initially operate said low pressure air valve during a predetermined portion of the cycle of operation of said mechanism, means to subsequently operate said high pressure air valve during another predetermined portion of the cycle of operation of said mechanism.

3. In apparatus of the class described, a source of high pressure air, a source of low pressure air, a cyclically operated pneumatically actuated mechanism having a normal cycle of operation which includes the initial application of low pressure air for the major portion of the cycle and subsequent the application of high pressure air for a predetermined portion of the cycle, separate means to govern each of said air sources, an automatic means to prevent the application of high pressure air by preventing operation of one of said governing means.

4. In apparatus of the class described, a source of high pressure air, a source of low pressure air, a cyclically operated pneumatically actuated mechanism, means to initially supply low pressure air to said mechanism during a predetermined portion of its cycle or operation, means to subsequently supply high pressure air to said mechanism during another predetermined portion of its cycle of operation, said last means including an electrically actuated valve, an automatic means to prevent closing of the circuit to said electrically actuated valve to prevent the application of high pressure air to said mechanism.

5. In a clutch control apparatus for presses, in combination with means for operating the press, a fluid actuated clutch mechanism, means to initially supply low pressure to said mechanism, means to subsequently and at a predetermined time supply high pressure to said clutch mechanism, means to cut-out the high pressure at a predetermined time and to then reestablish the low pressure and means actuated by the press operating means for automatically effecting said sequential actuation of the pressure means.

6. In a clutch control apparatus, a source of high fluid pressure, a source of low fluid pressure, a fluid actuated clutch mechanism, means to initially supply low pressure to said clutch mechanism, means to subsequently and at a predetermined time supply high pressure to said clutch mechanism, and automatic means to cut-out the high pressure at a predetermined time and to then reestablish the low pressure.

7. In apparatus of the class described, a source of high pressure air, a source of low pressure air, an air operated clutch, valves interposed between each of said air sources and said clutch, separate means to operate each of said valves, means to actuate said operating means from a shaft to which said clutch is connected and which is driven by said clutch when engaged, said means operating said low pressure air valve initially during a predetermined portion of the cycle of rotation of said shaft, and subsequently operating said high pressure air valve during another predetermined portion of the cycle of rotation of said shaft.

8. In a clutch control apparatus for presses having reciprocating dies, a fluid actuated clutch adapted to drive a die operating shaft, means to initially supply low pressure air to said clutch during a predetermined portion of the rotation of said shaft, and means to subsequently supply high pressure air to said clutch during another predetermined portion of the rotation of said shaft, said last portion corresponding to the period during which the dies are closed and working, said air supplying means being operated in synchronism with said shaft.

9. In a clutch control apparatus for presses having reciprocal dies, a source of high pressure air, a source of low pressure air, an air operated clutch for driving a die-operating shaft, means to initially supply low pressure air to said clutch during a predetermined period of rotation of the shaft, and means to subsequently supply high pressure air to the clutch during another predetermined period of rotation of said shaft and during which the dies are operating, said source of low pressure air being maintained at such degree to be insufficient to close the dies upon the slide of the press encountering an obstacle, or the dies encountering resistance to closing.

JERRY L. MOULDER.